United States Patent
Henzler (10) Patent No.: US 8,970,196 B2
(45) Date of Patent: Mar. 3, 2015

(54) MODE CONTROL CIRCUIT FOR DC-DC CONVERTER

(75) Inventor: Stephan Henzler, Munich (DE)

(73) Assignee: Infineon Technologies AG, Neubiberg (DE)

( * ) Notice: Subject to any disclaimer, the term of this patent is extended or adjusted under 35 U.S.C. 154(b) by 620 days.

(21) Appl. No.: 13/022,943

(22) Filed: Feb. 8, 2011

(65) Prior Publication Data

US 2012/0200271 A1   Aug. 9, 2012

(51) Int. Cl.
   *H02M 3/157*   (2006.01)
   *H02M 3/156*   (2006.01)

(52) U.S. Cl.
   CPC .................................. *H02M 3/156* (2013.01)
   USPC ........................................ 323/283; 323/284

(58) Field of Classification Search
   USPC .......................................... 323/283, 290, 284
   See application file for complete search history.

(56) References Cited

U.S. PATENT DOCUMENTS

| | | | | |
|---|---|---|---|---|
| 6,753,798 B2 * | 6/2004 | Feldtkeller | ..................... | 341/143 |
| 7,592,791 B2 * | 9/2009 | Emira | ............................ | 323/283 |
| 8,035,365 B2 * | 10/2011 | Kikuchi | ........................ | 323/282 |
| 8,624,571 B2 * | 1/2014 | da Silva et al. | ............... | 323/283 |
| 2005/0213358 A1 | 9/2005 | Feldtkeller | | |
| 2006/0145672 A1 | 7/2006 | Kernahan et al. | | |
| 2007/0257653 A1 * | 11/2007 | Naka | ............................. | 323/284 |
| 2008/0061758 A1 | 3/2008 | Nishida | | |
| 2009/0015227 A1 * | 1/2009 | Wong et al. | .................... | 323/283 |
| 2009/0174379 A1 * | 7/2009 | Lima et al. | .................... | 323/282 |
| 2010/0301822 A1 * | 12/2010 | Chen et al. | .................... | 323/283 |
| 2012/0169308 A1 * | 7/2012 | Dearborn et al. | ............. | 323/271 |

OTHER PUBLICATIONS

IEEE, 2000, IEEE STD 100-2000, http://ieeexplore.ieee.org/stamp/stamp.jsp?tp=&arnumber=4116811, p. 1272.*

Zhang, et al., "Digital PWM/PFM Controller with Input Voltage Feed-Forward for Synchronous Buck Converters", IEEE Conference and Exposition on Applied Power Electronics (APEC), Austin, Texas, Feb. 2008, pp. 523-528.

* cited by examiner

*Primary Examiner* — Gary L Laxton
*Assistant Examiner* — Gustavo Rosario Benitez
(74) *Attorney, Agent, or Firm* — SpryIP, LLC (57) ABSTRACT

Representative implementations of devices and techniques determine when a dc to dc converter switches from a first mode of operation to a second mode of operation. The determination is based on a time interval representing a portion of a current waveform, which is measured and compared to a threshold value.

9 Claims, 5 Drawing Sheets

FIG. 5

MODE CONTROL CIRCUIT FOR DC-DC CONVERTER

BACKGROUND

Various mobile or portable electronic devices may have reduced power consumption by operating some of the systems within these devices at low voltages (e.g., 3.0 volts, 1.5 volts, etc.). Such electronic devices often use direct current to direct current converters ("dc to dc converters" or "dc-dc converters") to "step down" voltages available from their power supplies to the lower voltages used by these systems.

Generally, dc-dc converters may be operated in two modes. The so called pulse width modulation (PWM) mode allows for high load current, but tends to be less efficient at low load currents. The so called pulse frequency modulation (PFM) mode can generally provide only a small load current, but is more efficient at low load currents than the PWM mode. Some dc-dc converters are capable of operating in both modes of operation, and may switch from one mode of operation to the other mode of operation when load current demands change. For example, a dc-dc converter may operate in PWM mode when higher load currents are used and switch to the more efficient PFM mode when lower load currents are used.

Different techniques are used by dc-dc converters to determine when to switch from one operating mode to another. One way some dc-dc converters control mode changes is by monitoring the amplitude of the current through the coil (inductor) of the dc-dc converter, and switching modes in the dc-dc converter when the current reaches a given threshold. The assumption in this approach is that a measurement of the amplitude of the coil current at a midpoint of the rising current waveform represents the average coil current, and that the average coil current is a reasonable indicator of the load current. This approach may be sufficient, so long as current is flowing through the coil (referred to as "continuous conduction mode"). However, to avoid a negative current flowing in the coil (which would discharge the output capacitor, negatively affecting the efficiency of the dc-dc converter), some dc-dc converters clamp the coil current at zero, and prevent the current from becoming negative (referred to as "discontinuous conduction mode"). In discontinuous mode, a measurement of the amplitude of the coil current at a midpoint of the rising current waveform no longer represents the average coil current (since a portion of the cycle is clamped near zero), and therefore does not represent the load current.

In addition, to reduce a printed circuit board (PCB) footprint and/or to reduce a bill of materials in some designs, there is a trend for some designers to decrease the size of the inductors used in dc-dc converters. A smaller coil (with less inductance) leads to faster slewing of the coil current, and thus to an increased trend towards dc-dc converters operating in discontinuous conduction mode.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Representative implementations of techniques and/or devices provide control of mode changes in a dc-dc converter, and in particular, determining when the dc-dc converter switches from a first mode of operation to a second mode of operation. In various implementations, the determination is based on a time interval representing a portion of a quasi-periodic current waveform, which is measured and compared to a threshold value. The dc-dc converter may be switched from the first mode of operation to the second mode of operation, depending on the comparison of the measured time interval to the threshold value.

In one implementation, the first mode of operation is a pulse width modulation (PWM) mode of operation and the second mode of operation is a pulse frequency modulation (PFM) mode of operation. In alternate implementations, the first and second modes may be interchanged, or may comprise one or more other operating modes.

Figure 1:
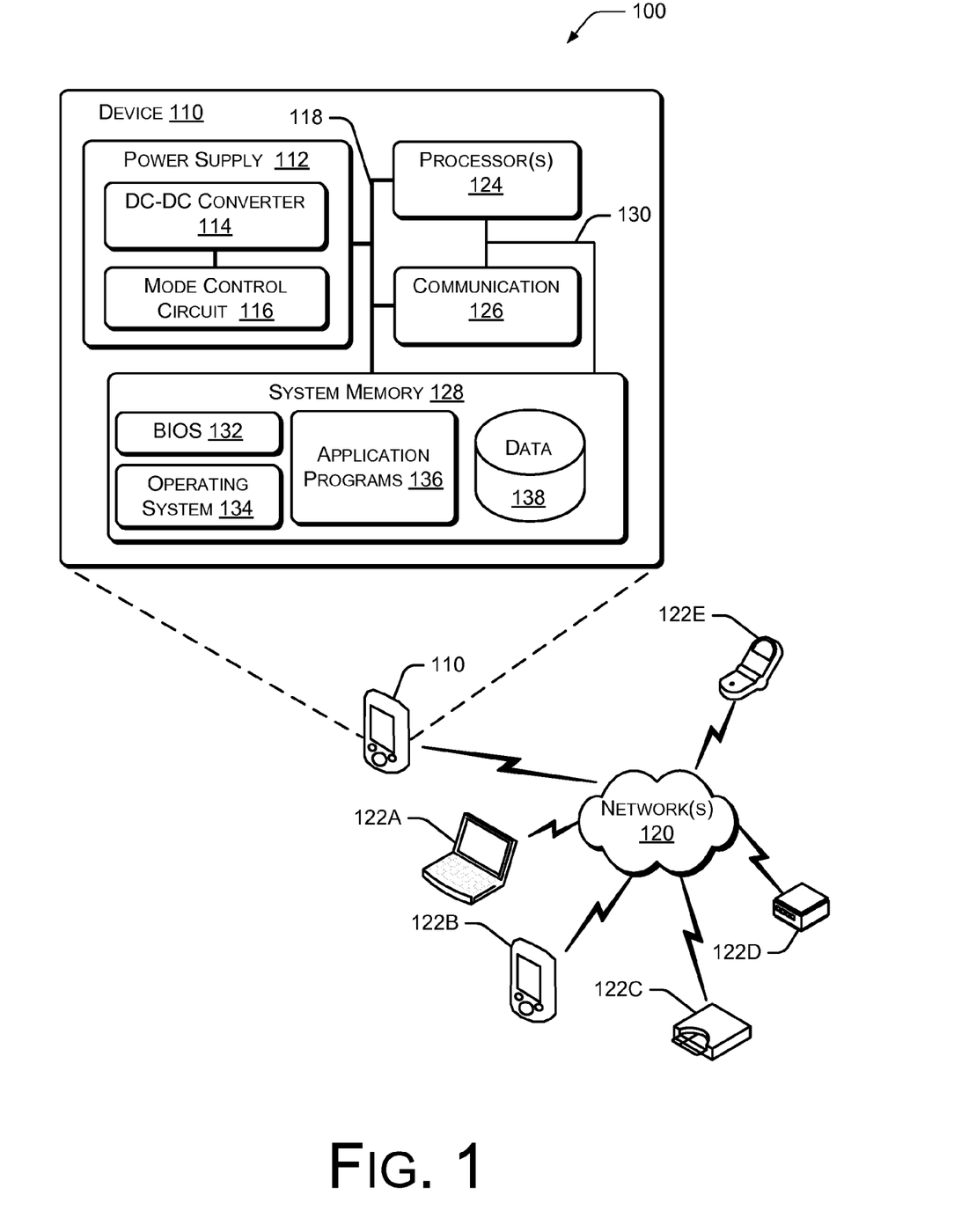
FIG. 1 is a representative environment in which the techniques in accordance with the present disclosure may be implemented.

Various implementations of mode control for a dc-dc converter with respect to a representative environment illustrated in FIG. 1 are discussed. The representative environment illustrates possible examples of the techniques and/or devices as applied to an electronic device. Techniques and devices of mode control are then discussed with reference to an example dc-dc converter circuit schematic and various related waveforms illustrated in FIGS. 2 and 3. The techniques and devices discussed may be applied to any of various dc-dc converter designs, circuits, and devices and remain within the scope of the disclosure. The illustrated waveforms show current through the coil in the example dc-dc converter, and demonstrate how a mode control determination may be made based on timing characteristics of the current waveforms. An example implementation of a mode control circuit and various alternate implementations are then discussed with reference to a block diagram illustrated in FIG. 4. Finally, this disclosure discusses an example process of controlling modes of operation of a dc-dc converter with reference to a flow diagram shown in FIG. 5.

Advantages of the disclosed techniques and devices are varied, and include: 1) accurate and precise mode control in low current discontinuous operation; 2) handover from the first mode of operation to the second mode of operation may be based on direct current (DC); 3) a mode control circuit may be implemented using all digital components and techniques, resulting in a design that may be programmable, robust, scalable, etc.; 4) a current threshold for switching from the first mode of operation to the second mode of operation can be set arbitrarily low, which is generally not possible with analog designs; 5) no additional current comparator is necessary; and 6) a mode control circuit may be implemented that is a basic extension to an existing controller, resulting in a lower risk, modular design approach. Advantages of the disclosed techniques may be more apparent in applications and designs where current magnitudes are designed to be lower and frequencies are designed to be higher.

Implementations are explained in more detail below using a plurality of examples. Although various implementations and examples are discussed here and below, further implementations and examples may be possible by combining the features and elements of individual implementations and examples.

Representative Environment

FIG. 1 illustrates a representative environment 100 in which techniques in accordance with the present disclosure may be implemented. In this implementation, the environment 100 includes a device 110, or other mobile and/or electronic devices, having implemented one or more power supplies 112 including a direct current to direct current converter ("dc to dc converter" or "dc-dc converter") 114 having a mode control circuit 116 configured in accordance with the teachings of the present disclosure. (For example, a mode control circuit 116 may include a mode control circuit 400, or the like, as discussed below.) As illustrated in FIG. 1, power from the power supply 112 may be distributed to various components of the device 110 via a power transmission bus 118, or a like conductor. In various implementations, the power supply may include one or more batteries, transformers, or other power supply related devices.

In alternative implementations, the mode control circuit 116 may be integrated with any other suitable portion of the device 110, or may be a separate, individual component of the device 110. For example, a power supply 112, a dc-dc converter 114, and/or a mode control circuit 116 may be a component of a remote or peripheral device coupled to the device 110 (e.g., a portable power source, shared power source, etc.). Detailed descriptions of various implementations of mode control circuits 116, methods, and techniques are provided in the following sections with reference to FIGS. 2 through 5.

The device 110 may operatively communicate via one or more networks 120, such as a wireless local area network (WLAN), with a plurality of other devices 122. Alternatively, the device 110 may bypass the networks 120 and communicate directly with one or more of the other devices 122.

In the representative environment 100, the device 110 may be a hand-held device, such as an MP3 (Moving Picture Experts Group Layer-3) player, a personal data assistant (PDA), a global positioning system (GPS) unit, mobile telephone, smart phone, or other similar hand-held device, and the other devices 122 may include, for example, a computer 122A, another hand-held device 122B, a compact disc (CD) or digital versatile disc (DVD) player 122C, a signal processor 122D (e.g., radio, navigational unit, television, etc.), and/or a mobile phone 122E. In alternative implementations, the devices 110, 122 may include any other suitable devices (e.g., automotive computing and/or entertainment device, appliance computing/control device, e-reader, tablet computer, etc.), and it is understood that any of the plurality of devices 122 may be equipped with mode control circuits 116 that operate in accordance with the teachings of the present disclosure.

As further shown in FIG. 1, the device 110 may include one or more processors 124 and one or more communication components 126 (e.g., transceivers, transmitters, receivers, modems, etc.), coupled to a system memory 128 by a system bus 130. The system bus 130 of the device 110 represents any of the several types of bus structures, including a memory bus or memory controller, a peripheral bus, an accelerated graphics port, and a processor or local bus using any of a variety of bus architectures. The communication component 126 may be configured to operatively communicate with one or more external networks 120, such as a cellular telephone network, a satellite network, an information network (e.g., Internet, intranet, cellular network, cable network, fiber optic network, LAN, WAN, Bluetooth™, etc.), an infrared or radio wave communication network, or any other suitable network.

The system memory 128 may also include computer-readable media, which may include memory components (e.g., magnetic or optical disk drives, etc.) configured to store data and/or program modules that are immediately accessible to and/or presently operated on by the processor(s) 124. For example, the system memory 128 may also store a basic input/output system (BIOS) 132, an operating system 134, one or more application programs 136, and program data 138 that can be accessed by the processor(s) 124 for performing various tasks desired by a user of the device 110.

Although the representative environment 100 is shown as in FIG. 1 as a portion of a communication network, this implementation is meant to serve only as a non-limiting example of a suitable environment for use of the devices, methods, and techniques described herein. Similarly, the device 110 is simply one non-limiting example of a suitable device that may include mode control circuits 116 in accordance with the present disclosure.

Example DC-DC Converter

Figure 2A:
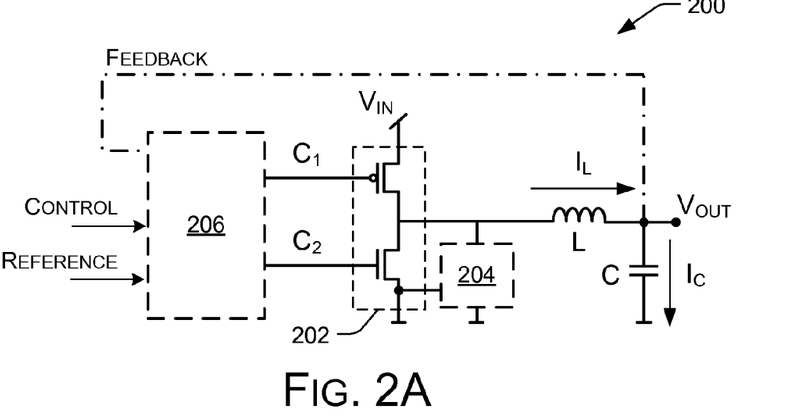
FIG. 2A is a schematic drawing of an example dc to dc converter circuit.

FIG. 2A is a schematic drawing showing an illustrative dc-dc converter circuit 200, wherein an implementation of a mode control circuit 116 may be employed. It is to be understood that a mode control circuit 116 may be implemented as part of the dc-dc converter circuit 200, or as part of another system as described with reference to the example environment above (for example as a peripheral to a dc-dc converter 200, etc.). The illustrated dc-dc converter in FIG. 2A is shown and described in terms of a "buck" device, which reduces the input DC voltage (V) to a desired lower output DC voltage ($V_{OUT}$). This illustration is, however, for ease of discussion. The techniques and devices described herein with respect to mode control for dc-dc converters is not limited to a buck device, and may be applied to other types of dc-dc converters (e.g., boost, buck-boost, etc.) without departing from the scope of the disclosure.

As shown in FIG. 2A, a dc-dc converter 200 may be designed with power supply switching devices 202 such as P-type Metal Oxide Semiconductor (PMOS) and N-type Metal Oxide Semiconductor (NMOS) devices controlled by control lines $C_1$ and $C_2$ for example. In other implementations, a dc-dc converter 200 may be implemented using diodes, other types of transistors (e.g. drain extended metal oxide semiconductor (DEMOS)), or the like, as power supply switching devices 202. The power supply switching function of the power supply switching devices 202 determines the flow of current $I_L$ through the coil (inductor) L and the current $I_C$ through the capacitor C by switching on and off the switching devices 202. Load current is supplied by both, the coil current $I_L$ and the current through the capacitor $I_C$ during operation. When the coil current $I_L$ is smaller than the load current, the current $I_C$ may be drawn out of the capacitor C and the voltage across the capacitor C may be reduced. While the coil current $I_L$ is larger than the load current, the current difference charges the capacitor C.

An example dc-dc converter 200 may optionally include a zero crossing detector 204 as illustrated. The zero crossing detector 204 may be used to detect when the coil current $I_L$ goes to a minimum amplitude (for example, reaches approximately zero amperes). In various embodiments, which will be detailed in later sections, the zero crossing detector 204 may be useful for timing purposes. In alternate examples, a zero crossing detector 204 may be used to determine when $C_1$ and/or $C_2$ turn off the power supply switching devices 202 to control the current to the load (e.g. putting the output stage into a tri-state condition in the case of discontinuous conduction mode).

An example dc-dc converter 200 may include a controller 206, (e.g., a PID regulator, a loop filter, etc.) to control operation of the switching devices 202. For example, the controller 206 may output the control signals $C_1$ and $C_2$ to the switching devices 202. In alternate implementations, the switching devices 202 may receive control signals $C_1$ and $C_2$ (or the like) from another control source. In some implementations, the controller 206 may receive control signal inputs and reference signal inputs as shown in FIG. 2A, and use the input signals to determine control signals $C_1$ and $C_2$. In further implementations, a feedback signal may be fed into the controller 206 from the output stage of the dc-dc controller 200. For example, the feedback signal may include the output voltage $V_{OUT}$.

Figure 2B:
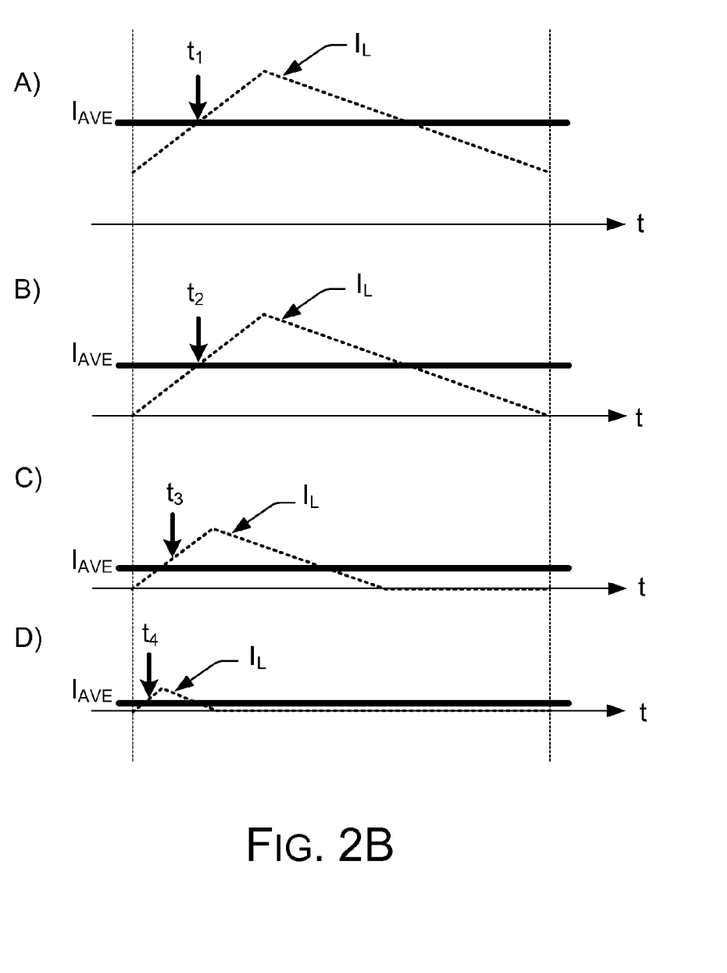
FIG. 2B is an illustration representing four example current waveforms of the example dc to dc converter circuit of FIG. 2A, and their corresponding average current values. The first two examples show continuous conduction mode, and the last two examples show discontinuous conduction mode.

FIG. 2B is an illustration representing four example current amplitude waveforms (graphs A-D) of the coil current $I_L$ of the example dc-dc converter 200 of FIG. 2A. The current waveforms represent a single cycle of a quasi-periodic waveform of the current $I_L$. Also shown in each of the graphs A-D is the average current amplitude $I_{AVE}$ of the respective current waveform $I_L$. Each successive graph (from A to D) represents an increasingly lower coil current $I_L$, and thus an increasingly lower load current demand on the dc-dc converter 200. The first two examples (graphs A-B) show the dc-dc converter 200 operating in continuous conduction mode, and the last two examples (graphs C-D) show the dc-dc converter 200 operating in discontinuous conduction mode.

Each of the graphs A-D also includes an indicator "t" representing the midpoint of the rising edge of the coil current waveform $I_L$. Since both of graphs A and B of FIG. 2B show triangular periodic waveforms for $I_L$, representative of a continuous conduction mode, the average amplitude value of each of these current waveforms may be found at the midpoint of the rising edge of the periodic waveforms. Accordingly, as can be seen in FIG. 2B, while graph B represents a lower current demand as compared to graph A, $t_1$ and $t_2$ are located at approximately the same moment in time, and they both correspond to the respective average current $I_{AVE}$ for each of these waveforms.

However, graphs C and D, representing even lower current demand on the dc-dc converter 200, are clamped waveforms, illustrating discontinuous conduction mode. As shown in FIG. 2B, the midpoint of the rising edge of these current waveforms $I_L$, as indicated by $t_3$ and $t_4$, does not correspond to the average current $I_{AVE}$ for these waveforms, and thus may not be used to indicate $I_{AVE}$. It can be seen in graphs C and D, that the lower the coil current $I_L$ (and thus the load current) becomes, the further to the left of the graph (the earlier in time) the midpoint "t" of the rising edge of the waveform becomes. Hence, for a given dc-dc converter 200, there is a relationship between the amplitude of the coil current $I_L$ and the moment in time represented by the midpoint "t" of the rising edge of the coil current waveform, and accordingly the rise time of the coil current waveform. As also shown in graphs C and D, the lower the coil current $I_L$ (and thus the load current) becomes, the further to the left of the graph (the earlier in time) the point where the falling edge reaches a minimum amplitude becomes. So, there is also a relationship between the amplitude of the coil current $I_L$ and the fall time of the current waveform, as well as a relationship between the amplitude of the coil current $I_L$ and the time of the unclamped portion (i.e., the rise time plus the fall time) of the current waveform. Alternately, a relationship also exists between the amplitude of the coil current and the clamped portion of the current waveform. Accordingly, measurements of time relative to characteristics of the coil current $I_L$ may be used as indicators of the amplitude of the coil current $I_L$, and thus the load current. In other words, time measurements may be translated to current amplitude measurements.

Representative Operating Principles

Figure 3:
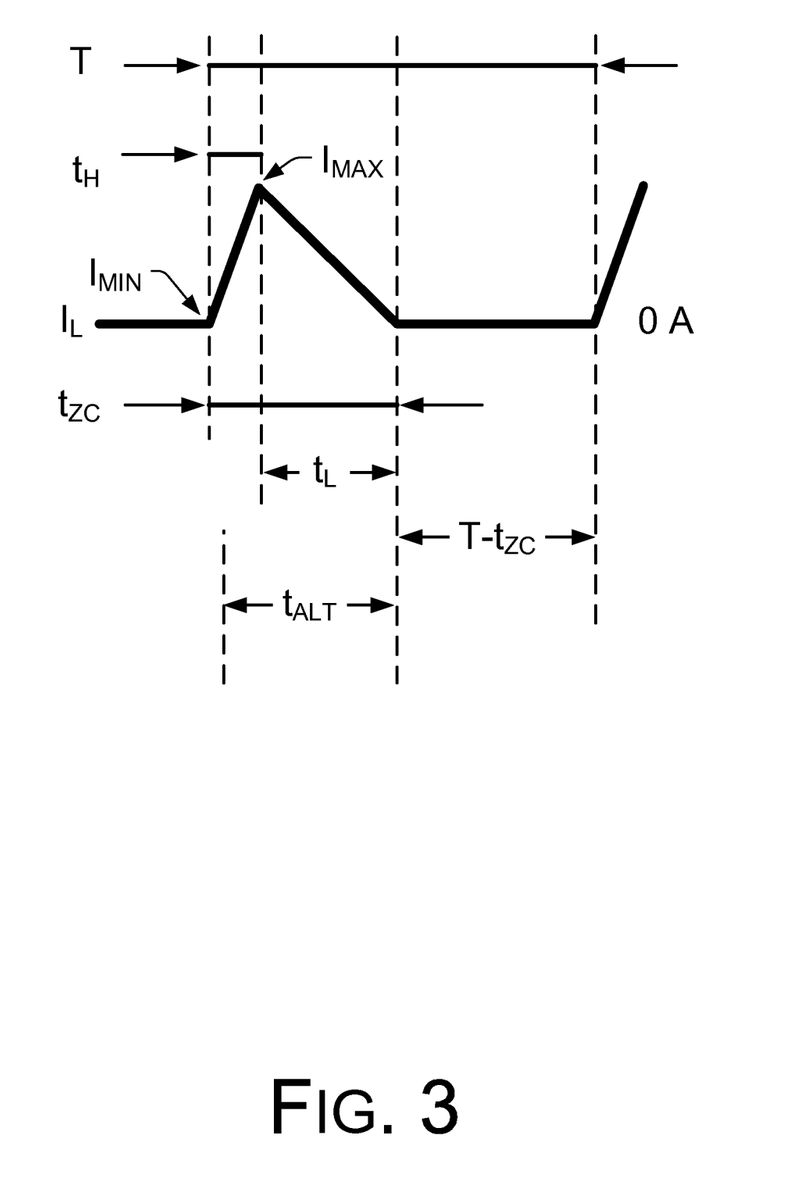
FIG. 3 is an illustration of a single cycle of an example quasi-periodic current waveform in discontinuous conduction mode.

FIG. 3 is an illustration of a single cycle of an example quasi-periodic current waveform $I_L$ (current waveform through a coil L of a dc-dc converter 200, for example) in discontinuous conduction mode, showing various time measurements with respect to the waveform. The waveform $I_L$ has a period of time T. The period T includes a time $t_{ZC}$, representing a time for the waveform $I_L$ to rise from a minimum magnitude $I_{MIN}$ (approximately zero amperes, for example) to a peak magnitude $I_{MAX}$, and fall back to the minimum magnitude $I_{MIN}$ during a cycle. Thus, $t_{ZC}$ represents the time of the unclamped portion of the waveform. The clamped portion of the waveform is given by time T-$t_{ZC}$. The rise time of the rising edge is given by time $t_H$ and the fall time of the falling edge is given by time $t_L$. The time interval $t_{ALT}$ (discussed further below) represents a time interval of the current waveform $I_L$ starting from a configurable position within the waveform $I_L$, rising to a peak level, and falling to the minimum magnitude $I_{MIN}$.

As illustrated in FIG. 3, in the first phase of the period T, the current rises from $I_{MIN}$ to $I_{MAX}$, in the second phase of the period T, the current falls until it reaches $I_{MIN}$ (the zero current level, for example), and in the third phase of the period T, the current is clamped to $I_{MIN}$ (approximately zero amperes, for example). The effective DC current of the current waveform of FIG. 3 may be given by equation (1):

$$i_{DC} = \frac{T}{2L}(V_B - V_O)\frac{V_O}{V_B}\left(\frac{t_{ZC}}{T}\right)^2 \qquad (1)$$

In this equation, $i_{DC}$ is the effective DC current (for example, $I_{AVE}$ from FIG. 2B), T is the period of the coil current waveform $I_L$, L is the inductance of the coil, $V_B$ is the input voltage (e.g., the battery voltage, $V_{IN}$ from FIG. 2A, for example), $V_O$ is the output voltage of the dc-dc converter, and $t_Z$ is the time for the current waveform $I_L$ to rise from a minimum magnitude $I_{MIN}$ to a peak magnitude $I_{MAX}$, and fall back to the minimum magnitude $I_{MIN}$ during a cycle of the current waveform $I_L$.

Since the effective current $i_{DC}$ (not shown for clarity) of the current waveform $I_L$ can be determined based on the period T and the timing information represented by $t_{ZC}$, such timing information may be used as a criterion to determine when to switch a dc-dc converter (dc-dc converter 200, for example) from PWM mode to PFM mode. For example, as will be discussed further below, a dc-dc converter 200 may be signalled to switch from a first mode of operation (e.g., PWM mode) to a second mode of operation (e.g., PFM mode) based on measuring the time $t_{ZC}$ and comparing it to a threshold time value. For example, when the time $t_{ZC}$ is less than the threshold value, a signal may be sent to trigger a switch from the first mode of operation to the second mode of operation. Alternately, the time $t_{ALT}$ may be measured, and a signal sent to trigger a switch from the first mode of operation to the second mode of operation when $t_{ALT}$ is less than a threshold value. In an alternate implementation, the dc-dc converter 200 may be signalled to switch from the first mode of operation to the second mode of operation when a measured time T-$t_{ZC}$ is greater than a threshold value.

Example Implementations

Figure 4:
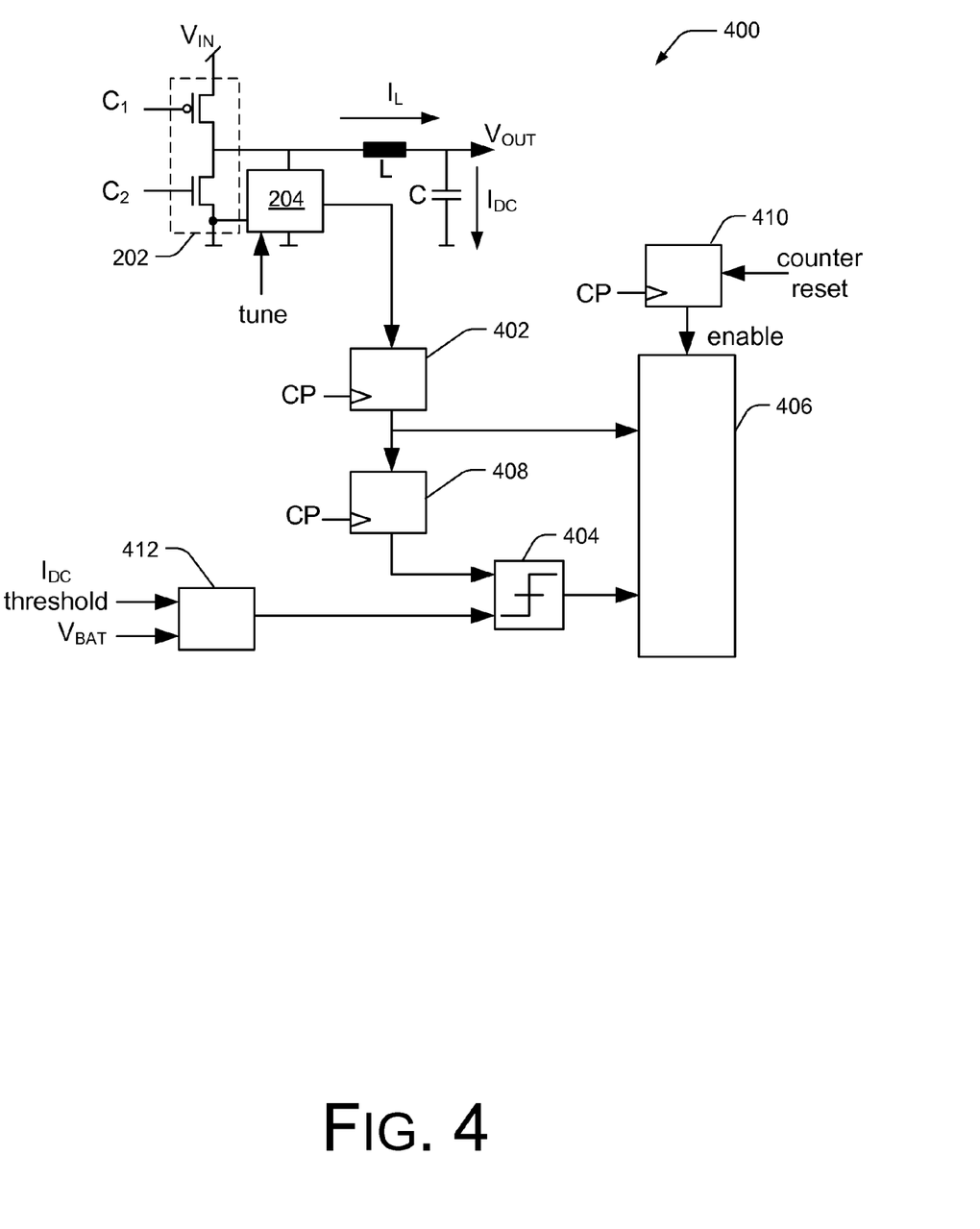
FIG. 4 is a schematic drawing of a mode control circuit for a dc to dc converter according to an example implementation.

FIG. 4 is a schematic drawing of a mode control circuit 400 for a dc-dc converter, such as dc-dc converter 200, according to an example implementation. The mode control circuit 400 of FIG. 4 is illustrated as being integral to an example dc-dc converter 200 of FIG. 2. For ease of discussion, only some details of an output stage of the example dc-dc converter 200 are shown in FIG. 4. In one implementation, a dc-dc converter 200 also includes a mode control circuit 400 (or the components of a mode control circuit 400). However, as mentioned above, a mode control circuit 400 may also be implemented as a stand-alone device, a peripheral device to the dc-dc converter 200, or the like. Further, for this discussion, the mode control circuit 400 is illustrated in FIG. 4 as having a multiplicity of components. Various implementations of mode control circuits, as described herein, may include fewer components and remain within the scope of the disclosure. Alternately, other implementations of mode control circuits may include additional components, or various combinations of the described components, and remain within the scope of the disclosure.

Implementations of a mode control circuit 400 may use timing to detect when the load current is low enough to trigger a mode of operation change in the dc-dc converter 200. In various implementations, one or more of the components of the mode control circuit 400 may be controlled using clock pulses CP (e.g., for timing, for synchronization, etc.).

According to one implementation, the mode control circuit 400 includes a current level detector 204 as described above. In an implementation, the current level detector 204 is configured to generate a signal when a current level of coil current $I_L$ reaches a desired current threshold value (magnitude). The signal generated when the current threshold value is reached may be configured to initiate an automatic handover of the dc-dc converter 200 from a first mode of operation (e.g., PWM mode of operation) to a second mode of operation (e.g., PFM mode of operation) as discussed below. In one implementation, the current level detector 204 is configured to generate the signal when the current level reaches a minimum magnitude. For example, in one implementation, the current level detector 204 is a zero crossing detector (the current threshold value is set to approximately zero amperes), generating a signal when the level of the coil current $I_L$ reaches a zero crossing (i.e., the current is approximately zero amperes).

In one implementation, the current threshold value is preset. In an alternate or additional implementation, the current threshold value is user-configurable or programmable to adjust the current threshold magnitude (i.e., to select a current level to detect). In one implementation, the current threshold value is preset or adjusted to a value above zero amperes to accommodate device latency, environmental conditions, or the like. For example, the current threshold value may be adjusted via the "tune" control illustrated in FIG. 4 to a suitable current threshold level (e.g., 10 mA, 50 mA, 100 mA, etc.) to compensate for latency in the devices, temperature changes, load changes, and so forth, making the dc-dc converter more stable and/or efficient. In such cases, the current level for clamping the coil current $I_L$ may be different than the current threshold value used by the current level detector 204 for signaling a handover.

According to one implementation, the current level detector 204 prompts a time measurement component 402 (e.g., a digital counter, time to digital converter, etc.) to measure a time interval based on receiving a signal from the current level detector 204. In one implementation, the time measurement component 402 starts measuring a time interval upon receiving a first signal, and stops measuring the time interval upon receiving a second signal from the current level detector 204. In one implementation, the first signal is also received from the current level detector 204.

In another implementation, the time measurement component 402 starts measuring the time interval based on receiving a signal derived from a control signal (for example, $C_1/C_2$) for switching components 202, and stops measuring the time interval upon receiving the second signal from the current level detector 204. For example, the time measurement component 402 may start measuring the time interval when a cycle of the current waveform begins, and stop measuring the time interval when the current reaches the current threshold value.

In alternate implementations, the first signal received by the time measurement component 402 may be any signal indicating a position within a cycle of the current waveform $I_L$. In some implementations, the position within the current waveform, indicated by the signal, may be configurable (i.e., by a user, with a programmable delay, based on device conditions, etc.). For example, the time measurement component 402 may be configured to start measuring the time interval at some position (e.g., 2 ns, 5 ns, 1 ms, etc.) after the start of the current waveform cycle. An example time interval measurement that starts at a configurable position within a cycle of the current waveform and stops at a minimum threshold value is $t_{ALT}$, as shown in FIG. 3. As discussed above, the time interval $t_{ALT}$ may be measured by the time measurement component 402 and used to trigger a handover event in an example dc-dc converter 200.

In an implementation, a comparison component 404 (i.e., comparator) receives the time interval measurement from the time measurement component 402 and compares the measured time interval to a threshold time value. In one embodiment, the comparison component 404 is user-configurable to adjust the threshold time value. In other implementations, the comparison component 404 may be programmed by other components to adjust the threshold time value, where the other components monitor various properties of the dc-dc converter 200 and/or its environment. For example, as will be discussed further, the comparison component 404 may be programmed to adjust the threshold time value based on a change to the input voltage (e.g., battery voltage, power supply voltage, etc.), the load current, and the like.

In an implementation, a triggering component 406 (also referred to as a handover controller) triggers the dc-dc converter 200 to switch from the first mode of operation to the second mode of operation based on the comparison received from the comparison component 404. For example, in one implementation, the time measurement component 402 measures a time interval $t_{ZC}$ as described above (with respect to FIG. 3), based on signals received from the current level detector 204. In that case, the triggering component 406 triggers the dc-dc converter 200 to switch from the first mode of operation to the second mode of operation when the measured time interval $t_{ZC}$ is less than the threshold time value. In another implementation, the time measurement component 402 measures a time interval $t_{ALT}$ as described above (with respect to FIG. 3), based on signals received, and triggers the dc-dc converter 200 to switch from the first mode of operation to the second mode of operation when the measured time interval $t_{ALT}$ is less than the threshold time value.

In an alternate implementation, the time measurement component 402 measures a time interval T-$t_{ZC}$ as described above based on signals received from the current level detector 204. In that case, the triggering component 406 triggers the dc-dc converter to switch from the first mode of operation to the second mode of operation when the measured time interval T-$t_{ZC}$ is greater than the threshold time value.

As discussed above, the time interval $t_{ZC}$ decreases as the load current decreases. If the current threshold value is set very low (e.g., 0.005 amperes), then the measured time interval $t_{ZC}$ may reach a lower limit (due to implementation related limitations). In an implementation, such current pulses may be skipped, rather than used to trigger a handover in the dc-dc converter 200 from a first operating mode to a second operating mode. In various implementations, however, this skip information may be counted and used together with the measurement of $t_{ZC}$ to determine when to trigger a handover event. For example, in an implementation, the triggering component 406 triggers a handover event in the dc-dc converter 200 based on a threshold number of skipped pulses plus a comparison of the measured time interval with the time interval threshold.

In one implementation, the mode control circuit 400 also comprises a low pass filter 408. In an implementation, the low pass filter receives the time interval measurements from the time measurement component 402, and filters the measured time intervals to produce an average measured time interval. The average measured time interval is received by the comparison component 404 where it is compared to the threshold time value. The triggering component 406 is configured to trigger the dc-dc converter 200 to switch from the first mode of operation to the second mode of operation based on the comparison of the average measured time interval to the threshold time value. In other words, the triggering component 406 may not trigger the dc-dc converter 200 to switch modes with a single measurement, but may trigger the dc-dc converter 200 to switch modes after a number of measurements. This prevents the triggering component 406 from triggering the dc-dc converter 200 based on a single unique measurement (e.g., due to noise, an anomalous transient event, varying load current, etc.), and makes the dc-dc converter 200 more stable. In a further implementation, the triggering component 406 may not trigger the dc-dc converter 200 to switch modes until a number of sequential measurements compare favorably to the threshold time value. In an implementation, the number of measurements may be predefined and/or user-programmable.

In an alternate or additional implementation, the triggering component 406 is configured to trigger the dc-dc converter 200 to switch from the first mode of operation to the second mode of operation based on the comparison of the average measured time interval to the threshold time value and based on the comparison of the measured time interval to the threshold time value. In other words both the average measured time interval and the last measured time interval are less than the threshold time value (in the case of a $t_{ZC}$ or $t_{ALT}$ measurement as described above) before the triggering component 406 triggers the dc-dc converter 200 to switch modes of operation. Alternately, both the average measured time interval and the last measured time interval are greater than the threshold time value (in the case of a T-$t_{ZC}$ measurement as described above) before the triggering component 406 triggers the dc-dc converter 200 to switch modes of operation.

In an implementation, the measured time interval is measured by the time measurement component 402 so that the measurement is available in digital form (i.e., by using a digital counter, time to digital converter, etc.) to the low pass filter 408. According to this implementation, the digital time measurement value can be filtered (i.e., averaged) by the low pass filter 408 and compared to the threshold time value by the comparison component 404.

In one implementation, the mode control circuit 400 also comprises a saturation counter 410 configured to measure a time that the dc-dc converter is operating in the first mode of operation. In alternate implementations, various logic and timing devices may be used as the saturation counter 410 (e.g., digital counter, digital timer, etc.). Using a saturation counter 410 may prevent the dc-dc converter 200 from toggling between the first and second operating modes, by inserting a delay in the handover at the triggering component 406. For example, the triggering component 406 may trigger the dc-dc converter 200 to switch from the first mode of operation to the second mode of operation based on a comparison of the measured time interval to the threshold time value and based on a minimum time that the dc-dc converter 200 operates in the first mode of operation. In other words, the triggering component 406 can be held from triggering a handover event unless the dc-dc converter 200 has been operating in the first mode for at least a minimum time. In an implementation, the saturation counter 410 includes a counter reset for initialization between timing sessions.

In an implementation, the mode control circuit 400 also comprises a calculation unit 412 configured to determine the threshold time value based on a threshold current value. In various implementations, the calculation unit 412 may comprise one or more of a simple processor, a memory device storing a data structure (e.g., including a look up table, etc.), logic circuits, and the like. In one implementation, the calculation unit 412 calculates the threshold time value based on equation (1) for the effective current discussed previously, or based on a variation of equation (1). Alternately or additionally, the calculation unit 412 determines the threshold time value based at least in part on a look up table. In various implementations, the look up table may be based on one or more of: the period of a current waveform associated with the current level, the inductance of the coil associated with the current waveform, the input voltage to the electronic device, or the output voltage of the dc-dc converter. For example, the calculation unit may refer to a look up table to determine the threshold time value, where the look up table is populated using the equation or a variation (simplified version, for example) of the equation.

The calculation unit 412 may determine an updated threshold time value when one or more parameters change, including: the period of a current waveform associated with the current level, the inductance of the coil associated with the current waveform, the input voltage to the electronic device, or the output voltage of the dc-dc converter. The updated threshold time value may be recalculated, may be referenced in the look up table, or the like. For example, the look up table may be cross-referenced such that when the calculation unit 412 receives an indication that the input voltage (for example) has changed (for instance from 6 volts to 5 volts), the calculation unit 412 is able to determine the corrected values of the threshold time value and/or the current threshold value (e.g., approximate zero crossing value, etc.) from the look up table based on the change to the input voltage.

Example Integrated DC-DC Converter

As mentioned above, in some implementations, the mode control circuit 400 is integral with the dc-dc converter 200. For example, an example dc-dc converter 200 may include some or all of the components discussed above regarding the mode control circuit 400. For instance, an example dc-dc converter 200 may include a current level detector 204 as described above. In one implementation, the current level detector 204 is a zero crossing detector configured to generate a signal when a quasi-periodic current waveform through a coil of the dc-dc converter crosses a minimum threshold value. For example, the minimum threshold value may be approximately zero amperes.

In an implementation, the dc-dc converter 200 includes a time interval measurement device 402 configured to measure a time interval based on the quasi-periodic current waveform as discussed above. In various implementations, the time interval measurement device 402 is a digital counter, a time to digital converter, or the like.

In an implementation, the dc-dc converter 200 includes a post processing device 408 configured to filter a measurement value of the time interval measurement device 402. For example the post processing device 408 may be a low pass filter, or the like. In one implementation, filtering the measurement value includes averaging multiple measurement values of the time interval measurement device 402.

In an implementation, the dc-dc converter 200 includes a comparator 404 configured to compare a filtered time interval measurement to a time interval threshold as discussed above.

In an implementation, the dc-dc converter 200 includes an event generator 406 (also referred to as a handover controller or a triggering component) configured to generate a handover event based on the comparison of the filtered time interval measurement to the time interval threshold. For example, the handover event may include a switch of the dc-dc converter 200 from a first mode of operation to a second mode of operation. In various implementations, the first mode of operation comprises a pulse width modulation (PWM) mode of operation and/or the second mode of operation comprises a pulse frequency modulation (PFM) mode of operation.

In an alternate implementation, the event generator 406 is configured to generate the handover event based on the comparison of the filtered time interval measurement to the time interval threshold, and based on a comparison of the time interval measurement to the time interval threshold. For example, in the case of a $t_{ZC}$ or a $t_{ALT}$ measurement (as discussed above), the event generator 406 may generate the handover event when the filtered (average) time interval measurement is less than the time interval threshold and the last measured time interval is also less than the time interval threshold. In a further alternate implementation, the event generator 406 may generate the handover event when the filtered (average) time interval measurement and the last measured time interval are both greater than the time interval threshold (in the case of a T-$t_{ZC}$ measurement implementation).

In an alternative implementation the event generator 406 is configured to generate the handover event based on a time interval measurement that is started when one of the switching devices 202 (the NMOS switch transistor, for example) is turned on, (i.e. when the coil current $I_L$ is maximum), and is stopped when the coil current crosses a threshold value.

In one implementation, the measured time interval comprises a time from a start of a cycle of the quasi-periodic current waveform to a crossing by the quasi-periodic current waveform of the minimum threshold value. In that implementation, the event generator 406 generates the handover event when the filtered time interval measurement is less than the time interval threshold. In another implementation, the measured time interval comprises a time from a crossing by the quasi-periodic current waveform of the minimum threshold value to a start of a next cycle of the quasi-periodic current waveform. Thus, the event generator 406 generates the handover event when the filtered time interval measurement is greater than the time interval threshold.

In alternate implementations, a dc-dc converter 200 and/or a mode control circuit 400 may comprise alternate or additional elements to those described herein, the alternate or additional elements configured to perform mode control functions as disclosed herein.

Representative Processes

Figure 5:
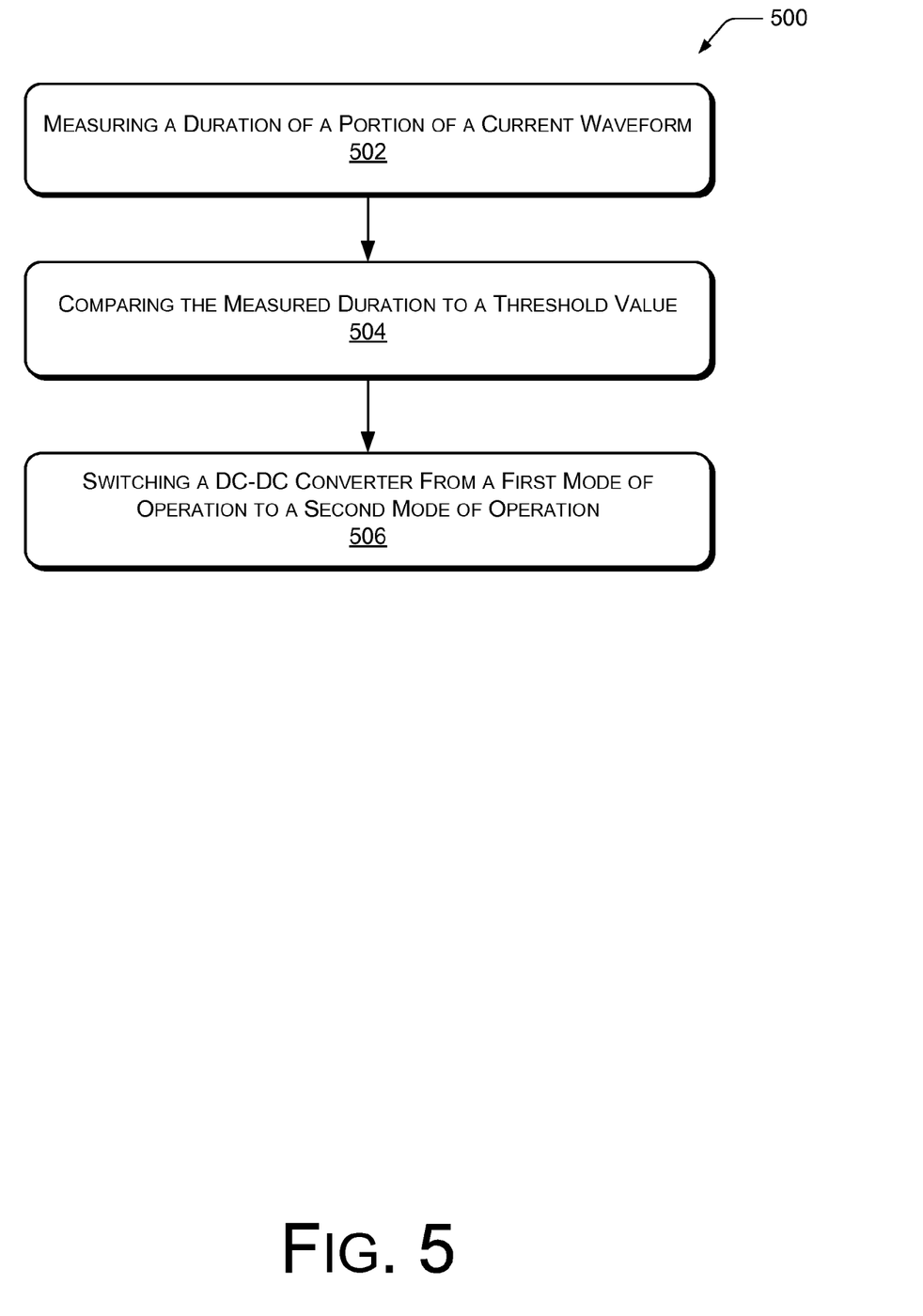
FIG. 5 is a flow diagram illustrating an example process of controlling a mode of operation of a dc to dc converter according to an implementation

FIG. 5 illustrates a representative process 500 for implementing mode control for a dc-dc converter (such as the dc-dc converter 200). An example process 500 includes determining when the dc-dc converter switches from a first mode of operation to a second mode of operation. In various implementations, the determination is based on a time interval representing a portion of a quasi-periodic current waveform, which is measured and compared to a threshold value. In one implementation, the first mode of operation comprises a pulse width modulation (PWM) mode of operation and the second mode of operation comprises a pulse frequency modulation (PFM) mode of operation. The process 500 is described with reference to FIGS. 2-4.

The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented in any suitable hardware, software, firmware, or a combination thereof, without departing from the scope of the subject matter described herein.

At block 502, a time measurement component (such as time measurement component 402) measures a time duration of a portion of a quasi-periodic current waveform (such as current waveform $I_L$). In one implementation, measuring the time duration comprises measuring a time from a start of a cycle of the quasi-periodic current waveform to a crossing by the quasi-periodic current waveform of a minimum threshold level (e.g., measuring the $t_{ZC}$ interval of FIG. 3). In another implementation, measuring the time duration comprises measuring a time from a configurable position within a cycle of the quasi-periodic current waveform to a crossing by the quasi-periodic current waveform of a minimum threshold level (e.g., measuring the $t_{ALT}$ interval of FIG. 3). In another implementation, measuring the time duration comprises measuring a time from a crossing by the quasi-periodic current waveform of a minimum threshold level to a start of a next cycle of the quasi-periodic current waveform (e.g., measuring the T-$t_{ZC}$ interval of FIG. 3). In an alternate implementation, measuring the time duration comprises measuring a time from a crossing by the quasi-periodic current waveform of a minimum threshold level to a configurable position within a next cycle of the quasi-periodic current waveform (e.g., measuring a T-$t_{ALT}$ interval of FIG. 3).

In one implementation, the process 500 further comprises detecting a zero crossing of the quasi-periodic current waveform and measuring the time duration with respect to the zero crossing (i.e., the minimum threshold level comprises the zero crossing of the quasi-periodic current waveform). For example, a current level detector (such as current level detector 204) may include a zero crossing detector, and detect a level of the quasi-periodic current waveform as it approaches zero amperes. In some implementations, the current level detector may be user-configurable to tune the current level to a desired detection level.

At block 504, a comparison component (such as comparison component 404) compares the measured time duration from block 502 to a user-configurable threshold value.

At block 506, a triggering component (such as triggering component 406) switches the dc-dc converter from the first mode of operation to the second mode of operation based on the comparison of the measured time duration to the user-configurable threshold value. In one implementation corresponding to a measurement of the $t_{ZC}$ (or $t_{ALT}$) interval as described above, the switching comprises switching the dc-dc converter from the first mode of operation to the second mode of operation when the measured time duration is less than the user-configurable threshold value. In another implementation, the switching comprises switching the dc-dc converter from the first mode of operation to the second mode of operation when the measured time duration is less than the user-configurable threshold value for at least a preset number of cycles of the quasi-periodic current waveform. In a further implementation corresponding to a measurement of the T-$t_{ZC}$ interval as described above, the switching comprises switching the dc-dc converter from the first mode of operation to the second mode of operation when the measured time duration is greater than the user-configurable threshold value.

In one implementation, the process 500 further comprises filtering a plurality of measured time durations by a low pass filter (such as low pass filter 408) to produce an average measured time duration. In such an implementation, the switching comprises switching the dc-dc converter from the first mode of operation to the second mode of operation when the average measured time duration reaches the threshold value.

In alternate implementations, other techniques may be included in the process 500 in various combinations, and remain within the scope of the disclosure.

CONCLUSION

Although the implementations of the disclosure have been described in language specific to structural features and/or methodological acts, it is to be understood that the implementations are not necessarily limited to the specific features or acts described. Rather, the specific features and acts are disclosed as representative forms of implementing the invention.

What is claimed is:

1. An electronic device comprising:
    a current level detector configured to generate a signal when a current level reaches a threshold magnitude;
    a time measurement component configured to start measuring a time interval upon receiving a first signal and stop measuring the time interval upon receiving a second signal from the current level detector;
    a comparison component configured to compare the measured time interval to a threshold time value;
    a triggering component configured to trigger a dc to dc converter to switch from a first mode of operation to a second mode of operation based on the comparison of the measured time interval to the threshold time value; and
    a low pass filter configured to filter a plurality of measured time intervals to produce an average measured time interval,
    wherein the triggering component is configured to trigger the dc to dc converter to switch from the first mode of operation to the second mode of operation based on a comparison of the average measured time interval to the threshold time value.

2. The electronic device of claim 1, wherein the current level detector is user-configurable to adjust the threshold magnitude and wherein the comparison component is user-configurable to adjust the threshold time value.

3. The electronic device of claim 1, wherein the measured time interval comprises a time for a current waveform through a coil of the dc to dc converter to rise to a peak level and fall to the threshold magnitude during a cycle of the current waveform; and wherein the triggering component triggers the dc to dc converter when the measured time interval is less than the threshold time value.

4. The electronic device of claim 1, wherein the measured time interval comprises a time of a cycle of a current waveform through a coil of the dc to dc converter, less a time for the current waveform to rise to a peak level and fall to the threshold magnitude during the cycle of the current waveform; and wherein the triggering component triggers the dc to dc converter when the measured time interval is greater than the threshold time value.

5. The electronic device of claim 1, wherein the current level detector is configured to generate the signal when the current level reaches a minimum magnitude.

6. The electronic device of claim 1, wherein the first mode of operation comprises a pulse width modulation mode of operation and wherein the second mode of operation comprises a pulse frequency modulation mode of operation.

7. The electronic device of claim 1, wherein the triggering component is configured to trigger the dc to dc converter to switch from the first mode of operation to the second mode of operation based on the comparison of the average measured time interval to the threshold time value and based on the comparison of the measured time interval to the threshold time value.

8. The electronic device of claim 1, further comprising a saturation counter configured to measure a time that the dc to dc converter is operating in the first mode of operation; and
    wherein the triggering component is configured to trigger the dc to dc converter to switch from the first mode of operation to the second mode of operation based on the comparison of the measured time interval to the threshold time value and based on a minimum time that the dc to dc converter operates in the first mode of operation.

9. The electronic device of claim 1, further comprising a calculation unit configured to determine the threshold time value based at least in part on one or more of: a period of a current waveform associated with the current level, an inductance of a coil associated with the current waveform, an input voltage to the electronic device, or an output voltage of the dc to dc converter.

* * * * *